3,058,924
POLYURETHANE FOAMS AND THE PROCESS FOR MAKING SAME

Paul Robitschek, Wilson, N.Y., assignor to Hooker Chemical Corporation, Niagara Falls, N.Y., a corporation of New York
No Drawing. Filed Oct. 2, 1958, Ser. No. 764,773
23 Claims. (Cl. 260—2.5)

This invention relates to novel polyurethane foams and the process for making same. More particularly it relates to polyurethane foams based upon adducts of hexahalocyclopentadiene and unsaturated monocarboxylic compounds.

The rigid plastic foam have found wide and varied use in industry. For instance, they may be used as core materials between skins of many and varied compositions. In aircraft construction the foam may be enclosed between aluminum or fiber glass reinforced plastic skins to form an assembly which is rigid, strong and yet remarkably light. Because of their excellent electrical properties polyurethane foams enclosed by fiber glass reinforced plastic skins have also found use in the construction of radomes. The polyurethane foams have another useful property; they develop a high degree of adhesion during the foaming process. As a result they will adhere to skins composed of such varied materials as metals, plastics, ceramics, glass, etc. The resulting sandwich-type assemblies lend themselves well for use in such diverse fields as in the construction and insulation industries.

The rigid plastic foams can also be utilized without skins as insulating materials to surround hot water or steam pipes, valves, etc. Their utility for such applications is enhanced by their ability to be applied, foamed, and used in situ.

The rigid plastic foams have many desirable properties. They have great structural strength coupled with low density. In sandwich-type constructions they exhibit a high degree of rigidity, a property particularly desirable for building purposes. They are excellent vibration dampers and may thus support high resonant loads. Because of their fine cell structure they are excellent heat and sound insulators. The foam cells may be made very fine and uniform, so that the cells are tough and non-brittle and hence highly resistant to rupturing.

This invention has as its object the attainment of novel polyurethane foamable compositions and foamed materials which are based upon the reaction products of hexahalocyclopentadiene and unsaturated monocarboxylic compounds.

It is the finding of this invention that rigid, low density, fire-resistant polyurethane foams are attainable by reacting an unsaturated monocarboxylic compound with a hexahalocyclopentadiene to form the adduct and by then reacting this adduct with an alcohol possessing three or more hydroxyl groups and an aliphatic dicarboxylic compound to yield a polyester which can then be reacted with a polyisocyanate and a foaming agent to yield a foam having the aforementioned properties.

For a fuller understanding of this invention, reference should be had to the following examples:

EXAMPLE 1

Thirty-three and eight-tenths grams of dimer acid (dimer acid is chiefly a $C_{36}$ dibasic acid produced by the polymerization of unsaturated fatty acids. It is produced by Emery Industries Incorporated as Empol 1022 and by Wilson-Martin Company as Wilmar Dioleic 150) and 40.7 grams of pentaerythritol were charged into a 250 milliliter three-necked flask fitted with a stirrer, condenser and gas disperser. The temperature was raised to one hundred and sixty degrees centigrade and held for one-half hour. A slow stream of nitrogen was introduced and the temperature was raised to two hundred and thirty degrees centigrade. This temperature was maintained until ninety percent of the calculated water was driven off. The temperature was lowered to one hundred and sixty degrees centigrade and one hundred and fifty grams of 1,4,5,6,7,7 - hexachlorobicyclo - (2.2.1) - 5 - heptene - 2 - carboxylic acid (adduct of hexachlorocyclopentadiene and acrylic acid) was added. The temperature was held at one hundred and sixty degrees centigrade and a slow stream of nitrogen was passed through the solution. At an acid number of fifteen, ten grams of polyglycerol W (which is a polyetherification product of glycerol manufactured by the Colgate-Palmolive Company) was added to clarify the melt and the process was stopped

EXAMPLE 2

*Preparation of a Urethane Foam From the Polyester of Example 1*

Fifty grams of the polyester of Example 1, plasticized with five grams tricresyl phosphate was heated to eighty degrees centrigrade, and twenty-seven grams of Nacconate 80 (a mixture of eighty percent 2,4-tolylene diisocyanate and twenty percent 2,6-tolylene diisocyanate) was added with rapid stirring. At the end of 2.5 minutes, 4.4 milliliters of tertiary amyl alcohol containing six drops of concentrated sulfuric acid was added to the mixture. After six minutes the mixture was heated to one hundred and twenty degrees centigrade for one hour to yield a rigid, fire-resistant, self-extinguishing foam of a density of 2.73 lb./ft.$^3$.

EXAMPLE 3

*Use of Formic Acid as a Foaming Agent*

Fifty grams of the polyester of Example 1 was heated to one hundred and twenty degrees centigrade and plasticized with five grams of tricresyl phosphate. Twenty grams of the mixture was weighed into a one hundred and fifty milliliter beaker and cooled to sixty degrees centigrade. To this mixture was added thirteen grams of tolylene diisocyanate (Naconnate 80) and the ingredients were stirred until compatibility was attained. Three minutes later one gram of formic acid was added with rapid mixing. Within thirty seconds foaming commenced. The mixture was poured at thirty seconds and permitted to expand at room temperature. After expansion the foam was cured at one hundred and twenty degrees centigrade for one hour. The product was a rigid, fire-resistant, self-extinguishing foam of density 4.6 lb./ft.$^3$.

EXAMPLE 4

One hundred and thirty-three grams of glycerol and one hundred and three grams succinic acid were charged into a one-liter, three-necked flask fitted with a stirrer and condenser. The temperature was permitted to rise to one hundred and ninety degrees centigrade while the water was being driven off. The temperature was then lowered to one hundred and seventy degrees centigrade and one hundred and fifty grams of the adduct of hexachlorocyclopentadiene and acrylic acid was added. Vacuum was applied and the temperature was maintained at one hundred and sixty-five to one hundred and seventy degrees centigrade for four hours.

EXAMPLE 5

*Preparation of a Foam From Example 4*

To fifty grams of the polyester of Example 4 was added 0.5 gram water, 0.9 gram dimethyl ethanolamine and 1.0 gram Emulphor EL–719 surface active agent. The components were stirred until compatibility occurred. To this mixture was added forty-five grams of a semi-prepolymer (the reaction product of fifty grams of the polyester cited in Example 4, and two hundred grams Nacconate 80, the previously defined commercial mixture of tolylene diisocyanate isomers). The components were stirred thoroughly for one and one-half minutes, and then the mixture was poured into a cardboard container. Expansion occurred at room temperature. After fifteen minutes the foam was placed in an oven and cured at one hundred and twenty degrees centigrade for fifteen minutes. The final product had a density of 3.4 lb./ft.$^3$, very fine cell structure, was rigid and self-extinguishing.

Although the foregoing examples are all based upon the adduct of acrylic acid and hexachlorocyclopentadiene, this is not in any way to be interpreted as limiting the scope of the invention. Adducts based upon any hexahalocyclopentadiene in which the halogen is selected from the group consisting of chlorine, bromine, fluorine and mixtures thereof may be used in this invention.

Monocarboxylic, unsaturated compounds which may be used in place of acrylic acid, without intending to be exhaustive thereof are acrylic esters, methacrylic acid and methacrylic esters. The chemical names of some of the adducts embraced within this invention are: 1,4,5,6,7,7-hexachlorobicyclo-(2.2.1)-5-heptene-2-carboxylic acid, which is the adduct of hexachlorocyclopentadiene and acrylic acid; 2-methyl-1,4,5,6,7,7-hexachlorobicyclo-(2.2.1)-5-heptene-2-carboxylic acid, which is the adduct of hexachlorocyclopentadiene and methacrylic acid; methyl-1,4,5,6,7,7-hexachlorobicyclo-(2.2.1)-5-heptene-2-carboxylate, which is the adduct of hexachlorocyclopentadiene and methyl acrylate; methyl-2-methyl-1,4,5,6,7,7-hexachlorobicyclo-(2.2.1)-5-heptene-2-carboxylate, which is the adduct of hexachlorocyclopentadiene and methyl methacrylate; and ethyl-1,4,5,6,7,7-hexachlorobicyclo-(2.2.1)-5-heptene-2-carboxylate, which is the adduct of hexachlorocyclopentadiene and ethyl acrylate.

Alcohols possessing three or more hydroxyl groups which may be used in place of pentaerythritol, without intending to be exhaustive thereof are glycerol, trimethylol propane, isomers of hexanetriol and of butanetriol, trimethylolethane, etc.

Aliphatic dicarboxylic compounds which may be used are dimer acid, succinic acid, maleic anhydride, adipic acid, azelaic acid, adipoyl chloride, itaconic anhydride and fumaryl chloride.

The following Examples 6 and 7 illustrate the formation of a polyester based upon the adduct of hexachlorocyclopentadiene and ethyl acrylate and a polyurethane foam made from same.

EXAMPLE 6

One hundred and fifty grams of dimer acid and one hundred and thirteen grams of pentaerythritol were charged into a one-liter, three-necked flask, fitted with a stirrer and condenser. The temperature was raised to one hundred and sixty degrees centigrade and held for one-half hour. Vacuum was applied and the temperature was raised to two hundred and thirty degrees centigrade. This temperature was maintained until ninety percent of the calculated water was driven off. The temperature was lowered to one hundred and sixty-five degrees centigrade and three hundred and seventy-three grams of ethyl-1,4,5,6,7,7-hexachlorobicyclo-(2.2.1)-5-heptene-2-carboxylate was added. One-half gram of lead oxide was added as catalyst. Vacuum was applied and the temperature was maintained at one hundred and sixty-five degrees centigrade for six hours. At the end of this period thirty-five grams of polyglycerol W was added to clarify the melt.

EXAMPLE 7

*Preparation of Urethane Foam From the Polyester of Example 6*

Fifty grams of the polyester of Example 6, plasticized with five grams tricresyl phosphate was heated to eighty degrees centigrade and twenty-seven grams of Nacconate 80 (a mixture of eighty percent 2,4-tolylene diisocyanate and twenty percent 2,6-tolylene diisocyanate) was added with rapid stirring. At the end of 2.5 minutes, 4.4 milliliters of tertiary amyl alcohol containing six drops of concentrated sulfuric acid was added to the mixture. After ten minutes the mixture was heated to one hundred and twenty degrees centigrade for one hour to yield a rigid, fire-resistant, self-extinguishing foam.

Examples 8 and 9 following, illustrate the formation of a polyester based upon the adduct of hexachlorocyclopentadiene and acrylic acid, adipic acid, and a mixture of glycerol and pentaerythritol, and a polyurethane foam made from same.

EXAMPLE 8

Seventy-three and six-tenths grams of glycerol, 27.2 grams of pentaerythritol and 87.6 grams adipic acid were charged into a two hundred and fifty milliliter, three-necked flask, fitted with a stirrer and condenser. The temperature was gradually raised to one hundred and ninety degrees centigrade. After eighty percent of the water was driven off the temperature was lowered to one hundred and sixty-five degrees centigrade, and one hundred and thirty-eight grams 1,4,5,6,7,7-hexachlorobicyclo-(2.2.1)-5-heptene-2-carboxylic acid was added. Vacuum was applied and the temperature was maintained at one hundred and sixty-five degrees centigrade for twelve hours. The final acid number was less than one.

EXAMPLE 9

*Preparation of a Urethane Foam From the Polyester of Example 8*

To fifty grams of the polyester of Example 8 was added one gram water, 0.9 gram dimethyl ethanolamine and one gram of Emulphor EL-719 surface active agent. The components were mixed until compatible. To this mixture was added 46.6 grams of a semi prepolymer (the reaction product of fifty grams of the polyester of Example 8 and two hundred grams Nacconate 80). The components were mixed thoroughly for one minute, and then the mixture was poured into a cardboard container. Expansion occurred at room temperature. After fifteen minutes the foam was cured at one hundred and twenty degrees centigrade for fifteen minutes. The final product was a rigid, low density foam which was self-extinguishing.

The polyisocyanate concentration may be varied from about thirty to one hundred and thirty percent of isocyanato groups based on the number of hydroxyl and carboxyl groups in the polyester and foaming agent. The foams obtained with the higher concentrations are resilient but their resiliency decreases as the polyisocyanate increases above one hundred percent. The foams made with the thirty percent polyisocyanate concentration are very brittle. The preferred range of polyisocyanate concentration for the foam of the present invention is about eighty-five to about one hundred and fifteen percent.

Foaming agents which may be used in the present invention are those which liberate gaseous products when reacted with organic polyisocyanates. Such foaming agents include water, carboxylic acids and anhydrides, mixtures of tertiary alcohols and concentrated acids, formic acid, polymethylol phenols, polymethylol ureas, some activated secondary alcohols, and beta hydroxy aldehydes.

When foaming agents are used which are of the alcoholic type, it is generally desirable to add a catalyst in order that they will function at a suitable temperature. The catalyst should be either a strong inorganic or organic acid, or a Lewis type acid. Among these are sulfuric acid, phosphoric acid, para toluene sulfonic acid, aluminum chloride, nitric acid, chloro-sulfonic acid, and hydrochloric acid.

The proportion of the various ingredients of the foaming composition of the present invention may be varied over a wide range to obtain various properties. For instance, if a foam having a high degree of fire-resistance is desired, a larger halogen content must be employed. Foams containing twenty-five percent or more halogen by weight are very highly fire-resistant. Foams which contain four percent or less combined halogen by weight have a lower degree of fire-resistance. When varying percentages of halogen are used, the foam will have varying degrees of fire-resistance, the degree being generally in proportion to the amount of halogen incorporated into the foam. In general, in order to obtain a foam which is fire-resistant even in the absence of other additives, the alkyd resin which is used to make the foam should have a halogen content of at least about ten percent by weight.

The amount of foaming agent used is not critical but will be dictated by the type of foam desired. If a very dense foam is desired, only a small amount need be used. If a very light foam is desired, a maximum amount may be used. The amount used will also depend upon the type of foaming agent. When using a foaming agent comprised of a tertiary alcohol such as tertiary amyl alcohol, it has been found that 1.5 grams is sufficient to foam a total ingredient mixture of thirty-five grams to produce a fire-resistant foam having a density of 2.0 to 2.5 pounds per cubic foot.

When the tertiary alcohol type of foaming agent such as tertiary butyl or tertiary amyl alcohol is used, it must be used in conjunction with a catalytic amount of strong concentrated acid such as sulfuric acid. Generally speaking, up to 1.5 percent by weight of concentrated acid based on the total composition may be employed.

A large number of various polyisocyanates may be used in the present invention. The aromatic polyisocyanates are more reactive and less toxic than the aliphatic members and are consequently preferred. The compounds which are most readily available commercially are 2,4-tolylene diisocyanate, 2,6-tolylene diisocyanate and mixtures thereof. However, others may be used, among them: methylene-bis-(4-phenyl isocyanate); 3,3'-bitolylene-4,4'-diisocyanate; 3,3' - dimethoxy-4,4'-biphenylene diisocyanate; naphthalene-1,5-diisocyanate, etc. Nacconate 80, a mixture containing eighty percent of 2,4-tolylene diisocyanate and twenty percent 2,6-tolylene diisocyanate is frequently used since the material is readily available. However, this is not to be considered as limiting the scope of the invention.

Various additives can be incorporated which may serve to provide different properties. For instance, antimony oxide can be used to improve fire-resistance; fillers, such as wood flour, clay, calcium sulfate, or ammonium phosphate may be added to lower cost and improve density and fire-resistance; ingredients such as dyes may be added for color, and fibrous glass, asbestos or synthetic fibers may be added for strength. Plasticizers such as MPS–500, a mixture of methyl pentachlorostearate and epoxidized soy bean oil, may also be added to obtain desired properties.

It is to be understood that the invention is not limited to the specific examples which have been offered merely as illustrative and that modifications may be made within the scope of the appended claims without departing from the spirit of the invention.

I claim:

1. A fire-resistant cellular reaction product which is produced by reacting a composition comprising (A) a polyester comprised of the reaction product of (1) an adduct of hexahalocyclopentadiene and a monocarboxylic compound containing olefinic carbon-to-carbon unsaturation wherein the halogen is selected from the group consisting of chlorine, bromine, fluorine and mixtures thereof, (2) a polyhydric alcohol containing at least three hydroxy groups; (3) an aliphatic dicarboxylic compound, wherein said polyester has a halogen content of at least about ten percent by weight; (B) an organic polyisocyanate in an amount from about 30 to 130 percent of isocyanato groups based on the number of hydroxyl and carboxyl groups; and (C) a foaming agent which liberates gaseous products when reacted with (B); and curing the resultant product.

2. A fire-resistant cellular reaction product according to claim 1 wherein said hexahalocyclopentadiene is hexachlorocyclopentadiene.

3. A fire-resistant cellular reaction product according to claim 2 wherein said adduct is 1,4,5,6,7,7-hexachlorobicyclo-(2.2.1)-5-heptene-2-carboxylic acid.

4. A fire-resistant cellular reaction product according to claim 2 wherein said adduct is 2-methyl-1,4,5,6,7,7-hexachlorobicyclo-(2.2.1)-5-heptene-2-carboxylic acid.

5. A fire-resistant cellular reaction product according to claim 2 wherein said adduct is methyl-1,4,5,6,7,7-hexachlorobicyclo-(2.2.1)-5-heptene-2-carboxylate.

6. A fire-resistant cellular reaction product according to claim 2 wherein said adduct is methyl-2-methyl-1,4,5,6,7,7-hexachlorobicyclo-(2.2.1)-5-heptene - 2 - carboxylate.

7. A fire-resistant cellular reaction product according to claim 2 wherein said adduct is ethyl-1,4,5,6,7,7-hexachlorobicyclo-(2.2.1)-5-heptene-2-carboxylate.

8. A fire-resistant cellular reaction product according to claim 2 wherein said polyhydric alcohol is pentaerythritol.

9. A fire-resistant cellular reaction product according to claim 2 wherein said polyhydric alcohol is glycerol.

10. A fire-resistant cellular reaction product according to claim 2 wherein said polyhydric alcohol is trimethylol propane.

11. A fire-resistant cellular reaction product according to claim 2 wherein said polyhydric alcohol is hexanetriol.

12. A fire-resistant cellular reaction product according to claim 2 wherein said polyhydric alcohol is a mixture of glycerol and pentaerythritol.

13. A fire-resistant cellular reaction product according to claim 2 wherein said polyester (A) is a reaction product comprised of (1) 1,4,5,6,7,7-hexachlorobicyclo-(2.2.1)-5-heptene-2-carboxylic acid, (2) pentaerythritol, and (3) a $C_{36}$ dibasic acid.

14. A fire-resistant cellular reaction product according to claim 13 wherein said polyisocyanate is a compound selected from the group consisting of 2,4-tolylene diisocyanate, 2,6-tolylene diisocyanate, and mixtures thereof.

15. A fire-resistant cellular reaction product according to claim 2 wherein said polyester is a reaction product comprised of (1) 1,4,5,6,7,7-hexachlorobicyclo-(2.2.1)-5-heptene-2-carboxylic acid, (2) glycerol, and (3) succinic acid.

16. The process for imparting fire resistance to a polyurethane composition which comprises incorporating an adduct of hexahalocyclopentadiene and a monocarboxylic compound containing olefinic carbon-to-carbon unsaturation, wherein the halogen is selected from the group consisting of chlorine, bromine, fluorine and mixtures thereof, in (A) a polyester comprising a polyhydric alcohol containing at least three hydroxyl groups and an aliphatic dicarboxylic compound in an amount to provide a halogen content in said polyester of at least about ten percent by weight; and thereafter reacting the resulting composition with (B) an organic polyisocyanate in an amount from about 30 to 130 percent of isocyanato groups based on the number of hydroxyl and carboxyl groups, in the presence of a foaming agent which liberates gaseous products when reacted with (B); and curing the resultant product.

17. The process of claim 16 wherein said hexahalocyclopentadiene is hexachlorocyclopentadiene.

18. The process of claim 17 wherein said adduct is 2-methyl-1,4,5,6,7,7-hexachloro-bicyclo - (2.2.1) - 5-heptene-2-carboxylic acid.

19. The process according to claim 17 wherein said polyhydric alcohol is trimethylol propane.

20. A fire-resistant cellular reaction product according to claim 1, having a halogen content of at least twenty-five percent by weight.

21. The process of claim 16 wherein the adduct of hexahalocyclopentadiene is incorporated in an amount to provide a polyurethane composition having a halogen content of at least twenty-five percent by weight.

22. A fire-resistant cellular reaction product which is produced by reacting a composition comprising (A) a polyester comprised of the reaction product of (1) an adduct of hexahalocyclopentadiene and a monocarboxylic compound containing olefinic carbon-to-carbon unsaturation, wherein the halogen is selected from the group consisting of chlorine, bromine, fluorine and mixtures thereof, (2) pentaerythritol, and (3) a $C_{36}$ dibasic acid, wherein said polyester has a halogen content of at least about ten percent by weight; (B) an organic polyisocyanate in an amount from about thirty to one hundred and thirty percent of isocyanato groups based on the number of hydroxyl and carboxyl groups; and (C) a foaming agent which liberates gaseous products when reacted with (B); and curing the resultant product.

23. The process for imparting fire resistance to a polyurethane composition which comprises incorporating an adduct of hexahalocyclopentadiene and a monocarboxylic compound containing olefinic carbon-to-carbon unsaturation, wherein the halogen is selected from the group consisting of chlorine, bromine, fluorine and mixtures thereof, in (A) a polyester comprising a reaction product of pentaerythritol and a $C_{36}$ dibasic acid, in an amount to provide a halogen content in said polyester of at least about ten percent by weight; and thereafter reacting the resultant composition with (B) an organic polyisocyanate in an amount of about thirty to one hundred and thirty percent of isocyanato groups based on the number of hydroxyl and carboxyl groups, in the presence of a foaming agent which liberates gaseous products when reacted with (B); and curing the resultant product.

References Cited in the file of this patent
UNITED STATES PATENTS

| | | |
|---|---|---|
| 2,764,565 | Hoppe et al. | Sept. 25, 1956 |
| 2,839,553 | Soloway | June 17, 1958 |
| 2,865,869 | Hindersinn et al. | Dec. 23, 1958 |